Aug. 30, 1966  G. W. BUSH  3,269,495
PLASTIC HEAT-SEALED LUGGAGE HANDLE WITH HANDGRIP AND END LOOPS
Filed April 26, 1965
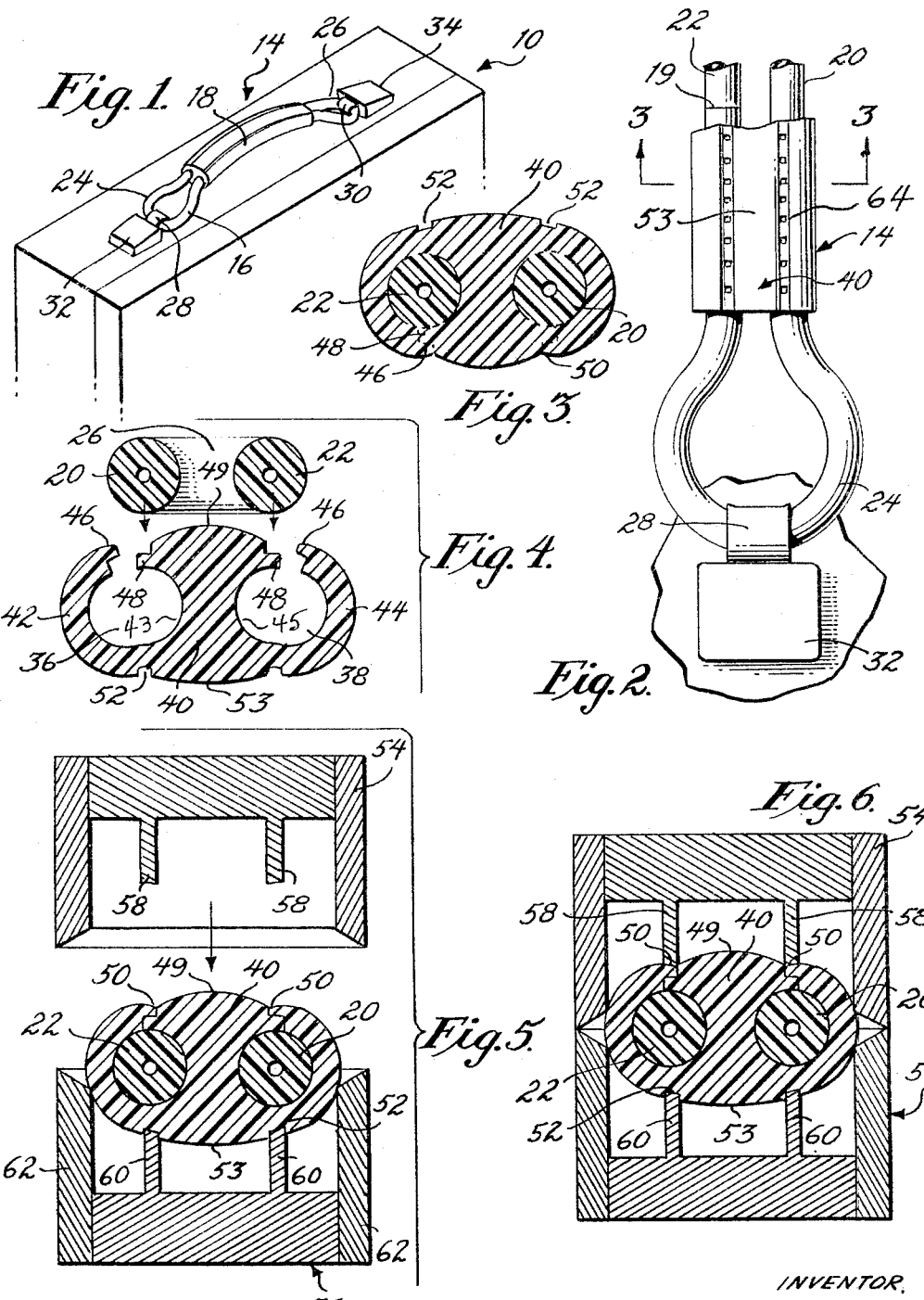
INVENTOR.
GEORGE W. BUSH
BY
Millman and Jacobs
ATTORNEYS.

ically spaced surfaces and longitudinal grooves in opposite sides thereof, walls spreadably connected to said core adjacent one of said vertically spaced surfaces and having free ends adapted to abut said core adjacent the other vertically spaced surface, said walls cooperating with said grooves to form longitudinal channels, said

United States Patent Office 3,269,495
Patented August 30, 1966

3,269,495
PLASTIC HEAT-SEALED LUGGAGE HANDLE WITH HANDGRIP AND END LOOPS
George W. Bush, Haddonfield, N.J., assignor to Philadelphia Handle Company, Inc., Camden, N.J., a corporation of New Jersey
Filed Apr. 26, 1965, Ser. No. 450,642
4 Claims. (Cl. 190—57)

This invention relates to handles for luggage, such as traveling bags, suitcases, briefcases, and other carrying cases.

One type of conventional handle presently on the market consists of a continuous bail and an open-ended sleeve which is slipped over the bail and acts to constrict the center and serves as a handgrip, the end portions of the bail thereby forming loops for pivotal connection to hardware on the luggage. While such a handle has the advantage of economy and simplicity, it has the functional disadvantages of providing inadequate support and of allowing relative movement between the sleeve or handgrip and the bail.

The primary object of this invention is to overcome these disadvantages while preserving the simplicity and economy of design afforded by the aforementioned bail and sleeve type handle.

Another object of the invention is to provide a handle for luggage having a continuous plastic bail and a plastic sleeve which is heat-sealed centrally to the flights of the bail to provide an integrated handle with end attaching loops and a central handgrip with improved properties of load support and grip comfort.

Another object of the invention is to provide a handle of the character described in which the handgrip consists of an extruded or cast-molded plastic having a pair of longitudinal channels which are spaced apart by a thick central section so that the flights of the bail can be readily inserted in the channels and there heat-sealed to provide a sturdy and attractive handle and an economical method of manufacturing the same.

These and other objects of the invention will become more apparent as the following description proceeds in conjunction with the accompanying drawing, wherein:

FIG. 1 is a perspective view of the upper portion of a piece of luggage embodying the invention;
FIG. 2 is an enlarged fragmentary plan view of the handle embodying this invention;
FIG. 3 is a sectional view taken on line 3—3 of FIG. 2;
FIG. 4 is a group sectional view showing the bail ready for inserting into the hand grip channels;
FIG. 5 is a group sectional view of the assembled handle in a heat sealing machine prior to sealing; and
FIG. 6 is a view similar to FIG. 5 showing the heat-sealing operation.

Specific reference is now made to the drawings wherein similar reference characters are used for corresponding element throughout.

Indicated generally at 10 is a piece of luggage or a carrying case, to the top wall 12 of which is attached the handle 14 of the instant invention.

The handle 14 is comprised of a plastic bail 16 and a plastic handgrip 18. The bail 16 is made of an elongated solid or tubular cylindrical extrusion of plastic which is formed into a continuous loop of desired length by butt welding the ends together as at 19. The loop thus formed includes a pair of flights 20 and 22 which are joined to each other at their ends by webs 24 and 26. The plastic used for the bail 16 and the handgrip 18 is preferably flexibly resilient and heat sealable; an example is polyvinyl chloride.

The handle 14 may be attached to the wall 12 by suitable loops 28 and 30 which embrace the webs 24 and 26, respectively, and which are in turn secured to the wall 12 by suitable attaching members 32 and 34, as is well known in the art.

The handgrip 14 is an extruded or cast elongated plastic member formed with a pair of longitudinal extended and substantially parallel channels 36 and 38 which are open to receive flights 20 and 22, respectively (see FIG. 4). The channels 36 and 38 extend the entire length of handgrip 14 and are separated by a thick, central section or core 40 which is coextensive with said channels. The cross section of the channels when closed is substantially circular. Thus, at opposite sides of the core 40 there are integral arcuate side walls 42 and 44 each of whose cross sectional thickness is less than that of the core 40 and which coact with the arcuate grooves 43 and 45 in the sides of the core to provide the channels. The free ends of the side walls 42 and 44 are provided with ledges of step formation 46 and the core 40 also has a pair of laterally spaced ledges 48 of step construction adjacent one of its surfaces 49 to mate with the ledges 46 in overlapped relationship and effect closure of the channels. When so closed longitudinal outer grooves 50 are formed for a purpose soon to appear.

A pair of longitudinal grooves 52 are provided in the opposite surface 53 of the core 40 which grooves are diametrically opposite the overlapping ledges 46, 48 and grooves 50.

The flights 20 and 22 are secured in the handgrip employing conventional heat sealing apparatus which includes an upper vertically movable die 54 and a lower stationary die 56. The upper die includes spaced longitudinal depending bars 58 whereas the lower die includes similarly spaced longitudinal upstanding bars 60, the spacing of the bars being such that the lower bars 60 fit into the grooves 52 and the upper bars into the grooves 50 or at the juncture at the steps 46 and 48 if no grooves 50 are provided.

In use, the channels 36 and 38 are opened and the flights 20 and 22 are pressed therein so that the bail is centered relative to the handgrip. The channels are then closed by overlapping the stepped ledges 46 and 48 and placed in the lower die 56 so that the grooves 52 engage the lower bars 60. In this position, the side walls 62 of the lower die at their upper edges exert a force against the side walls 42 and 44 to keep the channels 36 and 38 closed. The upper die 54 is then lowered to close off the lower die, in which position the bars 58 engage the junctures of the overlapped stepped ledges 46 and 48 or the grooves 50. When the apparatus is energized, the bars 58 and 60 conduct the heat and therefore cause fusion of the flights 20 and 22 to the handgrip 14 at longitudinally extending, transversely spaced diametrically opposed areas corresponding to the locations of the grooves 52 and the overlapped stepped ledges 46 and 48. It has been found desirable to scallop the free edges of the bars 58 and 60 to get better sealing action. The scallops can thus also provide simulated stitches, as seen at 64 in FIG. 2.

While a preferred embodiment of the invention has here been shown and described, a skilled artisan may make minor variations without departing from the spirit of the invention and the scope of the appended claims.

I claim:

1. A handle comprising a continuous bail including a pair of flights joined at their ends by webs, a unitary elongated handgrip including a central solid core with vertically spaced surfaces and longitudinal grooves in opposite sides thereof, walls spreadably connected to said core adjacent one of said vertically spaced surfaces and having free ends adapted to abut said core adjacent the other vertically spaced surface, said walls cooperating with said grooves to form longitudinal channels, said flights being received in said channels through the opening formed between the free ends of said walls and said core when said walls are spread apart, said free ends of said walls being fused to said core and to said flights to secure said flights in said channels and form said webs into loops for attachment to luggage, carrying cases and the like.

2. The handle of claim 1 wherein the cross-sectional thickness of said core exceeds that of each wall.

3. The handle of claim 1 wherein said flights are also fused to said core along longitudinal areas diametrically opposite the longitudinal areas of fusion of said free ends of said walls to said core and said flights.

4. The handle of claim 1 wherein said free ends of said walls and the adjacent portions of said core are formed of mating steps to provide a firmer closure upon fusion of said free ends to said core and flights.

References Cited by the Examiner

UNITED STATES PATENTS

| | | | |
|---|---|---|---|
| 971,876 | 10/1910 | Apple | 190—57 X |
| 1,774,949 | 9/1930 | Schwayder | 190—57 |
| 2,319,147 | 5/1943 | Mason | 16—125 X |
| 2,338,524 | 1/1944 | McCabe | 264—263 |
| 2,673,630 | 3/1954 | Axtell | 190—57 |
| 2,716,623 | 8/1955 | Tator | 264—263 |
| 3,038,217 | 6/1962 | Harris | 156—304 X |

JOSEPH R. LECLAIR, *Primary Examiner.*

FRANKLIN T. GARRETT, *Examiner.*

D. F. NORTON, *Assistant Examiner.*